US 8,115,679 B2

(12) United States Patent
Falk

(10) Patent No.: US 8,115,679 B2
(45) Date of Patent: Feb. 14, 2012

(54) SIDE LOBE SUPPRESSION

(75) Inventor: Kent Falk, Göteborg (SE)

(73) Assignee: SAAB AB (SE)

( * ) Notice: Subject to any disclaimer, the term of this patent is extended or adjusted under 35 U.S.C. 154(b) by 377 days.

(21) Appl. No.: 12/366,335

(22) Filed: Feb. 5, 2009

(65) Prior Publication Data
US 2009/0256749 A1    Oct. 15, 2009

(30) Foreign Application Priority Data
Feb. 7, 2008  (EP) ..................................... 08446503

(51) Int. Cl.
*G01S 3/06* (2006.01)
(52) U.S. Cl. ....................................................... 342/380
(58) Field of Classification Search .......... 342/379–380, 342/383; 367/905
See application file for complete search history.

(56) References Cited

U.S. PATENT DOCUMENTS

| | | | |
|---|---|---|---|
| 4,044,359 A | 8/1977 | Applebaum et al. |
| 4,246,585 A | 1/1981 | Mailloux |
| 5,343,211 A | 8/1994 | Kott |
| 5,592,178 A | 1/1997 | Chang et al. |
| 5,805,106 A | 9/1998 | Baum |
| 6,115,409 A | 9/2000 | Upadhyay et al. |
| 6,121,915 A | 9/2000 | Cooper et al. |
| 6,359,923 B1 | 3/2002 | Agee et al. |
| 6,624,783 B1 | 9/2003 | Rabideau |
| 7,129,888 B1 | 10/2006 | Chesley |
| 7,221,239 B2 | 5/2007 | Runyon |
| 2003/0025633 A1 | 2/2003 | Cai et al. |
| 2003/0179139 A1 | 9/2003 | Nemit et al. |
| 2006/0208945 A1 | 9/2006 | Kolanek |
| 2007/0296625 A1 | 12/2007 | Bruzzone et al. |
| 2009/0201214 A1 | 8/2009 | Falk |

FOREIGN PATENT DOCUMENTS

| | | |
|---|---|---|
| EP | 0308229 A2 | 3/1989 |
| EP | 0618641 A2 | 10/1994 |
| EP | 2088449 A1 | 8/2009 |
| JP | 2003-98251 A * | 4/2003 |
| WO | WO-87/07389 A2 | 12/1987 |
| WO | WO-2006/041338 A1 | 4/2006 |
| WO | WO-2006/130682 A1 | 12/2006 |
| WO | WO-2011/008146 A1 | 1/2011 |

OTHER PUBLICATIONS

"European Application Serial No. 08446503.8, Communication and European Search Report mailed Jun. 19, 2008", 10 pgs.
Li, R., et al., "Adaptive Channel Compensation Based on Bandwidth Partitioning", *Proceedings, 6th International Conference on Signal Processing (ICSP'02)*, vol. 1, (2002), 329-333.
Lin, F. C., et al., "Band-Partitioned Sidelobe Canceller for a Wideband Radar", *Proceedings IEEE Radar Conference*, (2003), 310-314.

(Continued)

*Primary Examiner* — Thomas Tarcza
*Assistant Examiner* — Fred H Mull
(74) *Attorney, Agent, or Firm* — Schwegman, Lundberg & Woessner, P.A.

(57) ABSTRACT

Embodiments include a method to suppress side lobes of a main antenna by creating cancellation directions using a Side Lobe Canceller (SLC). Various embodiments also provide the Side Lobe Canceller.

22 Claims, 7 Drawing Sheets

OTHER PUBLICATIONS

Vouras, P. G., et al., "Principal Component Filter Bank for Band Partitioned Sidelobe Cancellation", *Proceedings IEEE International Radar Conference*, (2005), 691-696.

"U.S. Appl. No. 12/366,351, Notice of Allowance mailed Dec. 5, 2011", 7 pgs.

"European Application Serial No. 08446502.0, Summons to Attend Oral Proceedings mailed Dec. 2, 2011", 4 pgs.

"European Application Serial No. 10174353.2, Office Action mailed Nov. 28, 2011", 5 pgs.

"U.S. Appl. No. 12/366,351 , Response filed Jul. 29, 2011 to Final Office Action mailed Jun. 16, 2011", 30 pgs.

"U.S. Appl. No. 12/366,351, Final Office Action mailed Jun. 16, 2011", 7 pgs.

"U.S. Appl. No. 12/366,351, Non Final Office Action mailed Jan. 27, 2011", 22 pgs.

"U.S. Appl. No. 12/366,351, Notice of Allowance mailed Aug. 26, 2011", 7 pgs.

"U.S. Appl. No. 12/366,351, Response filed May 27, 2011 to Non Final Office Action mailed Jan. 27, 2011", 35 pgs.

"European Application Serial No. 08446502.0, Communication and European Search Report mailed Oct. 1, 2008", 13 pgs.

"European Application Serial No. 08446502.0, Communication and Partial European Search Report mailed Aug. 6, 2008", 7 pgs.

"European Application Serial No. 08446502.0, Office Action mailed Jan. 14, 2011", 4 pgs.

"European Application Serial No. 08446502.0, Office Action mailed Feb. 10, 2010", 1 pg.

"European Application Serial No. 08446502.0, Response filed Jun. 8, 2010 to Office Action mailed Feb. 10, 2010", 50 pgs.

"European Application Serial No. 08446502.0, Response filed Jul. 14, 2011 to Office Action mailed Jan. 14, 2011", 41 pgs.

"European Application Serial No. 08446503.8, Office Action mailed Feb. 10, 2010", 1 pg.

"European Application Serial No. 08446503.8, Response filed Jun. 8, 2010 to Office Action mailed Feb. 10, 2010", 36 pgs.

"European Application Serial No. 10174353.2, Office Action and European Search Report mailed Jan. 17, 2011", 6 pgs.

"European Application Serial No. 10174353.2, Office Action mailed Sep. 9, 2010", 3 pgs.

"European Application Serial No. 10174353.2, Response dated Jul. 21, 2011 and filed Jul. 22, 2011, filed in reply to Office Actions mailed Feb. 21, 2011 and Jan. 17, 2011", 19 pgs.

"European Application Serial No. 10174353.2, Response filed Nov. 4, 2010 to Office Action mailed Sep. 9, 2010", 48 pgs.

Er, M. H., "An Alternative Implementation of Quadratically Constrained Broadband Beamformers", *Signal Processing*, 21(2), (1990), 117-127.

Frank, J., et al., "Broadband Phased Array Concepts", *Digest of the Antennas and Propagation Society International Symposium*, vol. 2, (1994), 1228-1231.

Kim, Y. S., et al., "Bandwidth Performance of 16-Element Thinned Phased Array with Tapped Delay-Line Filter", *IEEE Transactions on Antennas and Propagation*, 39(4), (1991), 562-565.

"U.S. Appl. No. 12/366,351, Amendment and Response filed Nov. 17, 2011", 50 pgs.

Dawood, M., et al., "Generalised wideband ambiguity function of a coherent ultrawideband random noise radar", *IEE Proceedings, Radar, Sonar Navigation*, 150(5), (2003), 379-386.

"European Application Serial No. 08446503.8, Communication under Rule 71(3) EPC mailed Dec. 6, 2011", 45 pgs.

\* cited by examiner

SIDE LOBE SUPPRESSION

RELATED

This application claims priority under 35 U.S.C. 119 to European Patent Application No. EPO 08446503.8, filed 7 Feb. 2008, which application is incorporated herein by reference and made a part hereof.

TECHNICAL FIELD

The invention relates to the field of suppression of side lobes of antennas.

BACKGROUND ART

Cancellation of side lobes are often used in radar systems in order to cancel jammer signals picked up in side lobes of a radar antenna. The existing solutions allow jammer signals from several jammer sources to be cancelled. One solution is described in U.S. Pat. No. 4,044,359 "Multiple Intermediate frequency side-lobe canceller". Side lobes are difficult to avoid when designing antennas and jammer signals can be picked up by these side lobes. As the jammer signals are often powerful they will cause interference with the signal from a target picked up in the main lobe even if the reception sensitivity of the side lobe is much below the reception sensitivity of the main lobe.

The principle of operation of prior art solutions is shown in FIG. 1 with a main antenna 101, an auxiliary array antenna 102 having N antenna elements $A_1$ to $A_N$, a control unit 103 and a cancelling circuit 104 with an output terminal 111. The main antenna has a main lobe 104 and side lobes 105-108. Jammer signals are emitted from jammer sources J1-J3. As can be seen in FIG. 1 jammer signals from J1 are picked up by the side lobe 108 in the main antenna and by the antenna elements in the auxiliary antenna 102. Signals $s_1$-$s_N$ from the antenna elements $A_1$ to $A_N$ are fed to the control unit 103. The control unit produces error signals $e_1$-$e_N$ which are fed to the cancelling circuit 104. The output from the main antenna 101 is fed to the cancelling circuit 104. There is also a feedback signal 112 from the output terminal 111 of the cancelling circuit to the control unit 103. In the control unit the feed back signal will be used to affect amplitude and phase of the input signals $s_1$-$s_N$ to produce the error signals $e_1$-$e_N$. When the error signals are subtracted in the cancelling circuit with the undesired signal from side lobes of the main antenna they will cancel the jammer signal so that only the signal representing the main lobe and non affected side lobes will be available at the output terminal 111. Thus the undesired signal/s picked up by the undesired side lobe/s is/are cancelled.

The drawback with the existing solutions today is that only narrow band cancellation of the side lobe is possible. This is a serious problem as radar antennas are often operating over a very wide bandwidth and the control unit is only capable of producing the error signals over a narrow bandwidth resulting in that the side lobe cancellation is only effective in a part of the operating bandwidth of the radar antenna.

Thus there is a need for an improved solution for providing a side lobe cancellation over a wide bandwidth in order to cancel jammer interference over a wide bandwidth.

SUMMARY OF THE INVENTION

The object of the invention is to remove the above mentioned deficiencies with prior art solutions and provide:
a method to suppress side lobes of a main antenna
a Side Lobe Canceller (SLC)
to solve the problem to achieve a side lobe cancellation over a wide bandwidth in order to cancel jammer interference over a wide bandwidth.

This object is achieved by providing a method to suppress side lobes of a main antenna by creating cancellation directions using a Side Lobe Canceller (SLC) comprising an auxiliary antenna and an Adaptive Side lobe Canceller control unit (ASC), the auxiliary antenna having N antenna elements/sub arrays 1 to N, N being $\geq 1$, feeding their output waveform/s $s_1$ to $s_N$ to the ASC. The SLC further comprises a feedback loop from an output terminal of the SLC to the ASC, wherein:

the Side Lobe Canceller (SLC) further comprising N transforming means $Tr_1$ to $Tr_N$ the ASC receives an output waveform from the main antenna each output waveform $s_1$ to $s_N$ from the antenna elements of the auxiliary antenna is fed also to the transforming means $Tr_1$ to $Tr_N$ a delay is introduced in the output waveform through a delay line a weighting function $W(\omega)$ being calculated for Q spectral components q, resulting from dividing the bandwidth B in q components, q being an integer index ranging from 0 to Q-1, for each antenna element or sub array ($A_1$-$A_N$) by minimizing the jammer influence on the output waveform z the transforming means affecting the waveforms from each antenna element/sub array by use of one or several control parameters calculated from the weighting function $W(\omega)$ at discrete angular frequencies $\omega_q$ the control parameters being continuously calculated in the ASC and fed to the transforming means through control signals $c_1$ to $c_N$ thus achieving cancellation of jammer interference over the entire bandwidth B when the output waveforms from the transforming means are subtracted in the time or frequency domain from the delayed output waveform of the main antenna.

The object is further achieved by providing a Side Lobe Canceller (SLC) used to suppress side lobes of a main antenna by creating cancellation directions. The SLC comprises an auxiliary antenna and an Adaptive Side lobe Canceller control unit (ASC), the auxiliary antenna having N antenna elements/sub arrays 1 to N, N being $\geq 1$, arranged to feed their output waveform/s $s_1$ to $s_N$ to the ASC. The SLC further comprises a feedback loop from an output terminal of the SLC to the ASC, wherein:

the Side Lobe Canceller (SLC) further comprising N transforming means $Tr_1$ to $Tr_N$ the ASC is arranged to receive an output waveform from the main antenna each output waveform $s_1$ to $s_N$ from the antenna elements of the auxiliary antenna is connected also to the transforming means $Tr_1$ to $Tr_N$ means for a delay in the output waveform is arranged with a delay line a weighting function $W(\omega)$ is arranged to be calculated for Q spectral components q, resulting from dividing the bandwidth B in q components, q being an integer index ranging from 0 to Q-1, for each antenna element or sub array ($A_1$-$A_N$) by minimizing the jammer influence on the output waveform z at a centre frequency $f_q$ of each spectral component and the transforming means are arranged to affect the waveforms from each antenna element/sub array by use of one or several control parameters calculated from the weighting function $W(\omega)$ at discrete angular frequencies $\omega_q$ the control parameters are arranged to be continuously calculated in the ASC and to be fed to the transforming means through control signals $c_1$ to $C_N$ thus achieving cancellation of jammer interference over the entire bandwidth B when the output waveforms from the transforming means are arranged to be subtracted in the time or frequency domain from the delayed output waveform of the main antenna.

Further advantages are achieved by implementing one or several of the features of the dependent claims which will be explained in the detailed description.

Various embodiments of the invention include a method to suppress side lobes of a main antenna using a side lobe canceller (SLC), the SLC comprising an auxiliary antenna and an Adaptive Side lobe Canceller control unit (ASC), the auxiliary antenna having N antenna elements, where the antenna element may also be a sub array, 1 to N, N being $\geq 1$, and a feedback loop from an output terminal of the SLC to the ASC, the method comprising:

using the ASC, receiving a main antenna output waveform from the main antenna;

using the ASC, receiving auxiliary antenna output waveforms $s_1$ to $s_N$ from the respective antenna elements or sub arrays of the auxiliary antenna;

transforming the auxiliary antenna output waveforms using respective transforming units $Tr_1$ to $Tr_N$ to provide transformed auxiliary antenna output waveforms;

delaying the main antenna output waveform to provide a delayed output waveform of the main antenna; and calculating a respective weighting function $W(\omega)$ for Q spectral components indexed by an integer q ranging from 0 to Q-1, the Q spectral components obtained via dividing a bandwidth B into Q components for each antenna element or sub array, the respective weighting function $W(\omega)$ calculated using a criterion to minimize a jamming influence on a side-lobe-suppressed main antenna output waveform from the SLC; and wherein the transforming the auxiliary antenna output waveforms includes using one or more control parameters calculated from the respective weighting function $W(\omega)$ at discrete angular frequencies $\omega_q$ using the ASC; and wherein, using the ASC, the one or more control parameters are calculated on a recurring basis and provided via respective control signals $C_1$ to $C_N$ for use in transforming the auxiliary antenna output waveforms; and wherein the method includes subtracting the transformed auxiliary antenna output waveforms in the time or frequency domain from the delayed output waveform of the main antenna to provide the side-lobe-suppressed main antenna output waveform from the SLC having reduced jamming influence over the bandwidth B.

Various embodiments of the invention include a Side Lobe Canceller (SLC) comprising an auxiliary antenna and an Adaptive Side lobe Canceller control unit (ASC), the auxiliary antenna having N antenna elements, where the antenna elements may also be a sub array, 1 to N, N being $\geq 1$, and a feedback loop from an output terminal of the SLC to the ASC, the SLC configured to:

receive a main antenna output waveform from a main antenna using the ASC;

receive auxiliary antenna output waveforms $s_1$ to $s_N$ from the respective antenna elements or sub arrays of the auxiliary antenna using the ASC;

delay the main antenna output waveform to provide a delayed output waveform of the main antenna; and calculate a respective weighting function $W(\omega)$ for Q spectral components indexed by an integer q ranging from 0 to Q-1, the Q spectral components obtained via dividing a bandwidth B into Q components for each antenna element or sub array, the respective weighting function $W(\omega)$ calculated using a criterion to minimize a jamming influence on a side-lobe-suppressed main antenna output waveform from the SLC;

transform the auxiliary antenna output waveform using respective transforming units $Tr_1$ to $Tr_N$ to provide transformed auxiliary antenna output waveforms, the transforming units configured to use one or more control parameters calculated from the respective weighting function $W(\omega)$ at discrete angular frequencies $\omega_q$, wherein each output waveform $s_1$ to $s_N$ from the antenna elements or sub arrays of the auxiliary antenna is provided to the transforming units $Tr_1$ to $Tr_N$;

calculate control parameters on a recurring basis;

provide the calculated control parameters to the respective transforming units via respective control signals $c_1$ to $C_N$ for use in transforming the auxiliary antenna output waveforms; and subtract the transformed auxiliary antenna output waveforms in the time or frequency domain from the delayed output waveform of the main antenna to provide the side-lobe-suppressed main antenna output waveform from the SLC having reduced jamming influence over the bandwidth B.

Various embodiments of the invention include a method to suppress side lobes of a main antenna using a side lobe canceller (SLC), the SLC comprising an auxiliary antenna and an Adaptive Side lobe Canceller control unit (ASC), the auxiliary antenna having N antenna elements, where the antenna element may also be a sub array, 1 to N, N being $\geq 1$, and a feedback loop from an output terminal of the SLC to the ASC, the method comprising:

using the ASC, receiving a main antenna output waveform from the main antenna;

using the ASC, receiving auxiliary antenna output waveforms $s_1$ to $s_N$ from the respective antenna elements or sub arrays of the auxiliary antenna;

transforming the auxiliary antenna output waveforms using respective transforming units $Tr_1$ to $Tr_N$ to provide transformed auxiliary antenna output waveforms;

delaying the main antenna output waveform to provide a delayed output waveform of the main antenna; and calculating a respective weighting function $W(\omega)$ for Q spectral components indexed by an integer q ranging from 0 to Q-1, the Q spectral components obtained via dividing a bandwidth B into Q components for each antenna element or sub array, the respective weighting function $W(\omega)$ calculated using a criterion to minimize a jamming influence on a side-lobe-suppressed main antenna output waveform from the SLC, wherein the criterion to minimize the jamming influence includes minimizing an output residual power of the side-lobe-suppressed main antenna output waveform, wherein the transforming the auxiliary antenna output waveforms includes using one or more control parameters calculated from the respective weighting function $W(\omega)$ at discrete angular frequencies $\omega_q$ using the ASC; and wherein, using the ASC, the one or more control parameters are calculated on a recurring basis and provided via respective control signals $c_1$ to $C_N$ for use in transforming the auxiliary antenna output waveforms; and wherein the method includes subtracting the transformed auxiliary antenna output waveforms in the time or frequency domain from the delayed output waveform of the main antenna to provide the side-lobe-suppressed main antenna output waveform from the SLC having reduced jamming influence over the bandwidth B, and further including:

successively time delaying auxiliary antenna output waveforms $s_{in}(m \cdot T)$ via respective transforming units in Q-1 time steps T, from 1 to Q-1 to provide time delayed copies of the auxiliary antenna output waveform $s_{in}(m \cdot T)$;

calculating, via respective transforming units, Q parameters comprising weighting coefficients $w_{n,0}$ to $w_{n,Q-1}$ for antenna element n, identified with two indexes, the first corresponding to the antenna element number, and the second corresponding to a consecutive number q representing a spectral component and ranging from 0 to Q-1, the Q parameters comprising weighting coefficients $w_{n,0}$ to $w_{n,Q-1}$ calculated via inverse Fourier transforming (IFT) $W(\omega)=A(\omega) \cdot e^{-j\omega\tau(\omega)}$ for the Q spectral components q, resulting from dividing the bandwidth B in Q components, the calculation being performed for each antenna element or sub array ($A_1$-$A_N$) by minimizing the jamming influence on the side-lobe-suppressed main antenna output waveform at a center frequency $f_q$ of each spectral component q; and multiplying, via respective transforming units, the auxiliary antenna output waveform $s_{in}(m \cdot T)$ with the first weighting coefficient $w_{n,0}$;

successively multiplying, via respective transforming units, respective time delayed copies of the auxiliary antenna output waveform with the weighting coefficient having the same second index as the number of time step delays T included in the time delayed copy of the auxiliary antenna output waveform; and summing, via respective transforming units, the result of each multiplication to provide an output waveform $s_{out}(m \cdot T)$ from each transforming unit, and reducing a number of operations to less than Q operations via (1) setting the first x weighting coefficients and the last y weighting coefficients in the series of weighting coefficients $w_{n,0}$ to $w_{n,Q-1}$ to zero, (2) integrating the first x time delays T into a time delay D, equal to $x \cdot T$, and (3) excluding the last y multiplications.

Various embodiments of the invention include a Side Lobe Canceller (SLC) comprising an auxiliary antenna and an Adaptive Side lobe Canceller control unit (ASC), the auxiliary antenna having N antenna elements, where the antenna elements may also be a sub array, 1 to N, N being $\geq 1$, and a feedback loop from an output terminal of the SLC to the ASC, the SLC configured to:

receive a main antenna output waveform from a main antenna using the ASC;

receive auxiliary antenna output waveforms $s_1$ to $s_N$ from the respective antenna elements or sub arrays of the auxiliary antenna using the ASC;

delay the main antenna output waveform to provide a delayed output waveform of the main antenna; and calculate a respective weighting function $W(\omega)$ for Q spectral components indexed by an integer q ranging from 0 to Q-1, the Q spectral components obtained via dividing a bandwidth B into Q components for each antenna element or sub array, the respective weighting function $W(\omega)$ calculated using a criterion to minimize a jamming influence on a side-lobe-suppressed main antenna output waveform from the SLC, wherein the criterion to minimize the jamming influence includes minimizing an output residual power of the side-lobe-suppressed main antenna output waveform;

transform the auxiliary antenna output waveform using respective transforming units $Tr_1$ to $Tr_N$ to provide transformed auxiliary antenna output waveforms, the transforming units configured to use one or more control parameters calculated from the respective weighting function $W(\omega)$ at discrete angular frequencies $\omega_q$, wherein each output waveform $S_1$ to $s_N$ from the antenna elements or sub arrays of the auxiliary antenna is provided to the transforming units $Tr_1$ to $Tr_N$;

calculate control parameters on a recurring basis;

provide the calculated control parameters to the respective transforming units via respective control signals $C_1$ to $c_N r$ for use in transforming the auxiliary antenna output waveforms; and subtract the transformed auxiliary antenna output waveforms in the time or frequency domain from the delayed output waveform of the main antenna to provide the side-lobe-suppressed main antenna output waveform from the SLC having reduced jamming influence over the bandwidth B;

successively time delay auxiliary antenna output waveforms $s_{in}(m \cdot I)$ via respective transforming units in Q-1 time steps T, from 1 to Q-1 to provide time delayed copies of the auxiliary antenna output waveform $s_{in}(m \cdot T)$;

calculate, via respective transforming units, Q parameters comprising weighting coefficients $w_{n,0}$ to $w_{n,Q-1}$ for antenna element n, identified with two indexes the first corresponding to the antenna element number and the second corresponding to a consecutive number q representing a spectral component and ranging from 0 to Q-1, the SLC configured to calculate Q parameters comprising the weighting coefficients $w_{n,0}$ to $w_{n,Q-1}$ via inverse Fourier transformation (IFT) of $W(\omega) = A(\omega) \cdot e^{-j\omega\tau(\omega)}$ for the Q spectral components q, resulting from dividing the bandwidth B in Q components, the calculation being performed for each antenna element or sub array ($A_1$-$A_N$) by minimizing the jamming influence on the side-lobe-suppressed main antenna output waveform at a center frequency $f_q$ of each spectral component q; and multiply, via respective transforming units, the auxiliary antenna output waveform $S_{in(m \cdot T)}$ with the first weighting coefficient $w_{n,0}$;

successively multiply, via respective transforming units, respective time delayed copies of the auxiliary antenna output waveform with the weighting coefficient having the same second index as the number of time step delays T included in the time delayed copy of the auxiliary antenna output waveform; and sum, via respective transforming units, the result of each multiplication to provide an output waveform $s_{out}(m \cdot T)$ from each transforming unit, wherein the SLC is configured to reduce a number of operations to less than Q operations via (1) setting the first x weighting coefficients and the last y weighting coefficients in the series of weighting coefficients $w_{n,0}$ to $w_{n,Q-1}$ to zero, (2) integrating the first x time delays T into a time delay D, equal to $x \cdot T$, and (3) excluding the last y multiplications.

DETAILED DESCRIPTION

Embodiments of the invention will now be described in detail with reference to the enclosed drawings. Embodiments of the invention are applicable for all types of receiving antennas. Henceforth in the description the invention will be exemplified with a radar antenna application.

Figure 1:
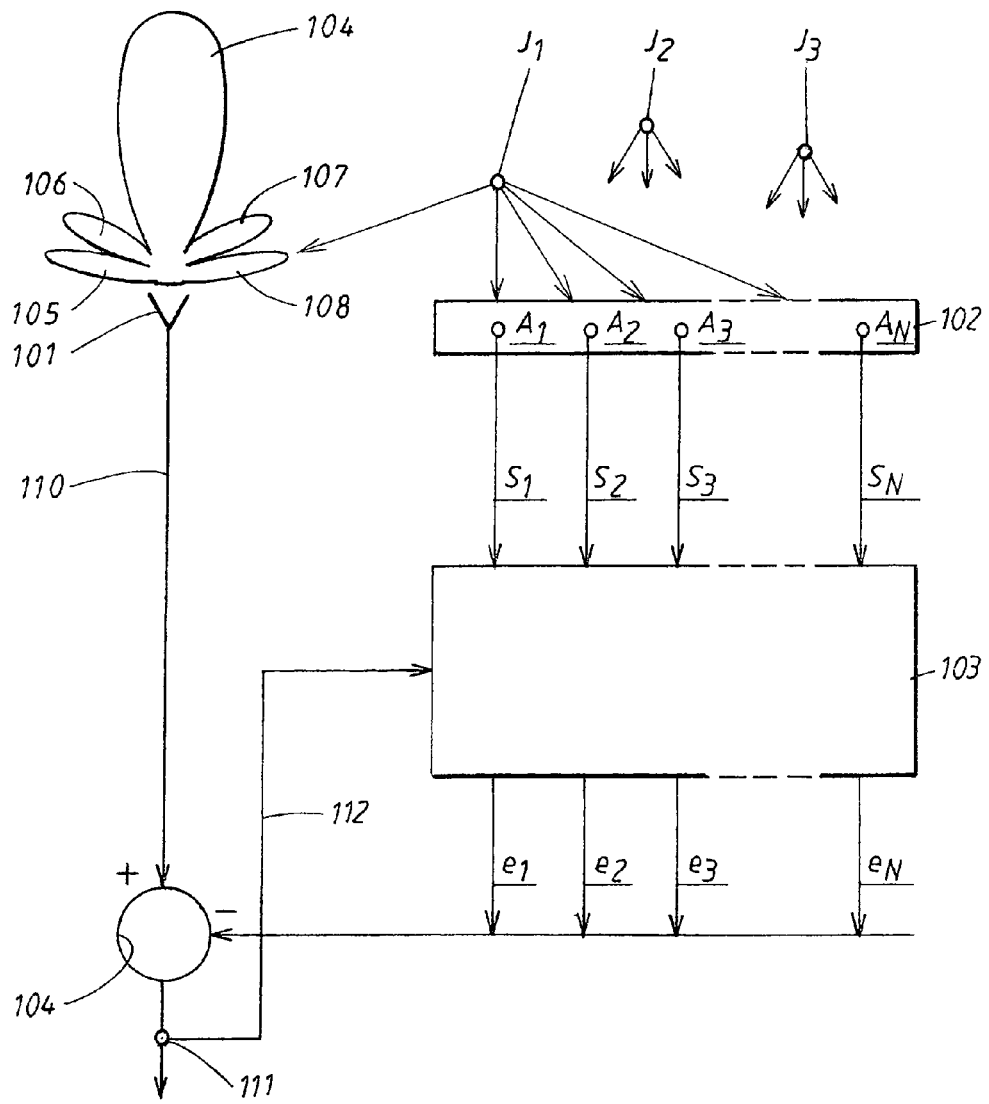
FIG. 1 schematically shows a prior art solution for side lobe cancellation.
Figure 2:
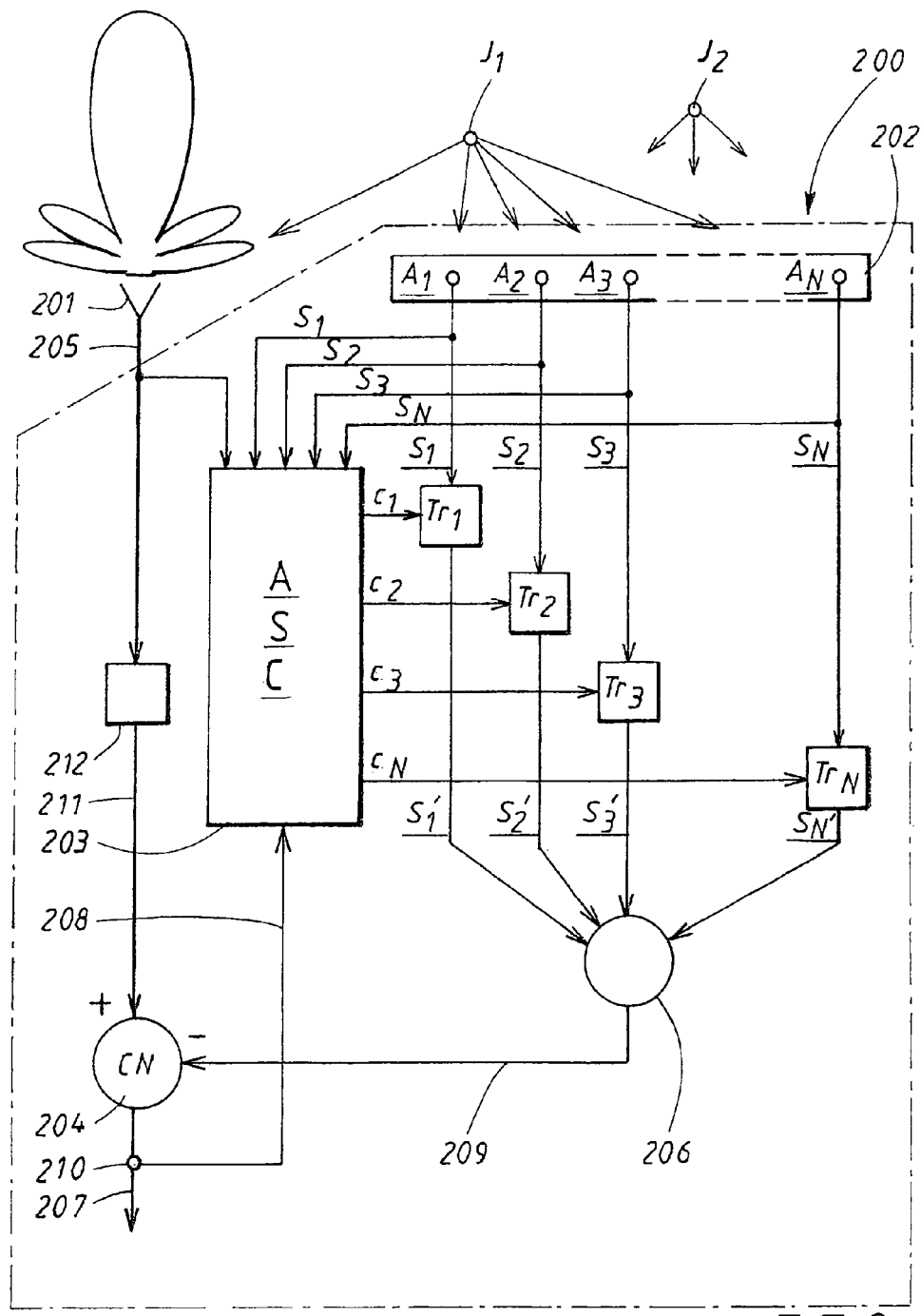
FIG. 2 shows a block diagram of an embodiment of the invention.

A block diagram of an embodiment of the invention implemented on a radar system is shown in FIG. 2. The main parts of a Side Lobe Canceller (SLC), 200, shown in FIG. 2 are a main antenna 201, an auxiliary antenna 202 consisting of antenna elements or a combination of antenna elements and sub arrays $A_1$-$A_N$, an Adaptive Side Lobe Canceller control unit (ASC) 203, transforming means $Tr_1$ to $Tr_N$, a Cancellation Network (CN) 204 and a delay line 212. The number of antenna elements/sub arrays is at least one, i.e. N≧1. A sub array consists of at least two antenna elements. The delay line is inserted between the main antenna and the CN, producing a delayed output waveform 211 of the main antenna. The delay can be adjusted from zero delay and upwards depending on distance between the auxiliary antenna and the main antenna. The delay is accomplished by conventional means well known by the skilled person. The transforming means are affecting waveforms from the auxiliary antenna. Each antenna element in the auxiliary antenna is connected to a transforming means in the embodiment of FIG. 2. Before FIG. 2 is explained in detail the transforming means will be further described. Henceforth in the description the term waveform is used to designate a signal in any form, continuous or pulsed.

Figure 3A:
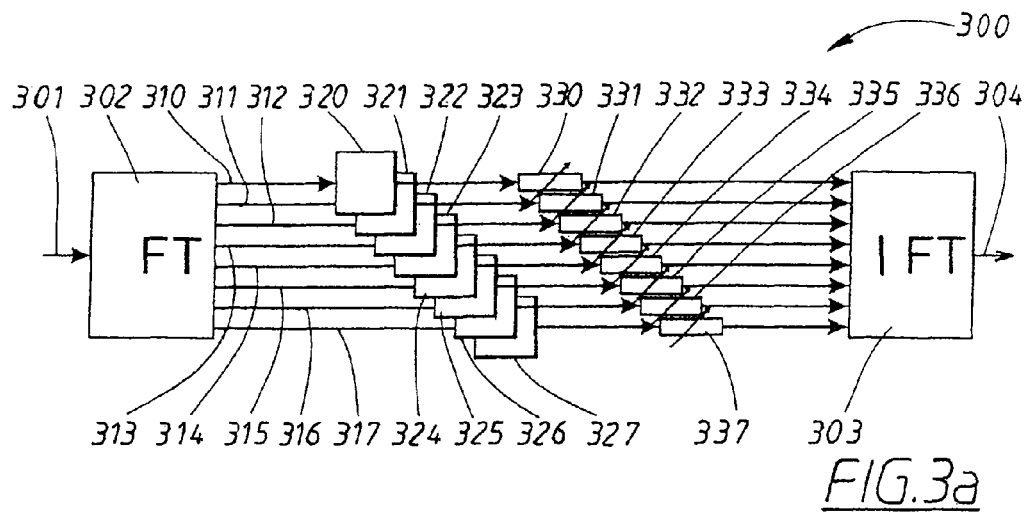
FIG. 3a schematically shows a digital solution of a realization in the frequency domain of a transforming means.

The transforming means in the embodiment of FIG. 2 will affect input waveforms $s_1$-$s_N$ entering the transforming means such that output waveforms $s_1'$ to $s_N'$ from the transforming means, when each of them is subtracted from the delayed output waveform 211 of the main antenna, can at most produce one cancellation direction for each waveform $s_1'$ to $s_N'$. Alternatively the waveforms $s_1'$ to $s_N'$ are first summed in a first summation network 206 and the summed signal is subtracted from the delayed output waveform 211 of the main antenna. Within the transforming means the waveforms will be affected by certain control parameters, updated on a recurring basis by the ASC 203 and explained further below. FIG. 3a schematically shows an example of a practical realization of a transforming means called a first control element. In this example a time delay being frequency dependent is used as a control parameter. The realization also includes another control parameter being a frequency dependent attenuation/amplification, i.e. the amplitudes of the waveforms are attenuated or amplified. In this embodiment two frequency dependent control parameters thus are used; time delay and attenuation/amplification. An input waveform $s_{in}(t)$, 301, representing one of the input waveforms $s_1$ to $s_N$, from an antenna element n in the auxiliary antenna, is fed to a Fourier Transformation (FT) unit 302 using for example a Fast Fourier Transformation (FFT), but other methods for calculation of the spectrum can be used. The FT unit transforms the input waveform $s_{in}(t)$, 301, into Q spectral components 0 to Q-1, in this example into 8 spectral components 310-317, each spectral component having a centre frequency $f_q$. However the transformation can be made into more or less spectral components. This means that a total bandwidth B covered by the radar system is divided in Q spectral components. The time delay $T_{n,q}$, (320-327) and the optional frequency dependent attenuation/amplification $a_{n,q}$ (330-337) are affecting each spectral component q from auxiliary antenna element n through any suitable time delay and/or attenuation/amplification means well known to the skilled person. The spectral component 310 thus has a time delay $T_{n,0}$, 320, and an attenuation/amplification $a_{n,0}$, 330, the spectral component 311 a time delay $T_{n,1}$, 321, and an attenuation/amplification $a_{n,1}$, 331, and so on until the spectral component 317 having a time delay $T_{n,7}$, 327, and an attenuation/amplification $a_{n,7}$, 337 in auxiliary antenna element n. All spectral components are fed to an Inverse Fourier Transformation (IFT) unit, 303, using Inverse Fast Fourier Transformation (IFFT) or any other suitable transformation method, as for example IDFT, transforming from the frequency domain to the time domain thus transforming all the spectral components back into the time domain and producing an output waveform $s_{out}(t)$, 304, representing one of the output waveforms $s_1'$ to $s_N'$.

The time delay $\tau_{n,q}$ and the attenuation/amplification $a_{n,q}$ are examples of control parameters for auxiliary antenna element n affecting each spectral component q where n ranges from 1 to N and q from 0 to Q−1.

The FT unit, the time delay and attenuation/amplification means and the IFT unit are parts of the first control element 300.

The function of the implementation with both the frequency dependent time delay and the attenuation/amplification according to FIG. 3a will now be described.

The control parameters mentioned above are calculated from a frequency dependent weighting function $W(\omega) = A(\omega) \cdot e^{-j \cdot \omega \cdot \tau(\omega)}$ and are affecting the waveforms $s_1$ to $s_N$ where $A(\omega)$, accounts for the frequency dependency of the attenuation/amplification and $\tau(\omega)$ account for the frequency dependency of the time delay. As an alternative the weighting function could be defined as $W(\omega) = A(\omega) \cdot e^{-j \cdot \phi(\omega)}$ where $A(\omega)$, still accounts for the frequency dependency of the attenuation/amplification and $\phi(\omega)$ accounts for the frequency dependency of the phase shift. Each auxiliary antenna element is connected to one first control element 300. The output waveform $s_{out}(t)$ 304 emitted from each first control element 300 as a function of the input waveform $s_{in}(t)$ 301 entering the first control element can be calculated with the aid of equation (1). The waveform $s_{in}(t)$ is on video-, intermediate frequency- (IF) or radio frequency (RF)-level.

$$s_{out}(t) = \underbrace{\frac{1}{2\cdot\pi} \cdot \int_{-\infty}^{\infty} W(\omega) \cdot \underbrace{\int_{-\infty}^{\infty} s_{in}(\tau) \cdot e^{-j\omega\tau} \cdot d\tau}_{\text{Fourier transform of } s_{in}(\tau)} \cdot e^{j\omega t} \cdot d\omega}_{\text{Invers Fourier transform back to the time domain}} \quad (1)$$

$$= \int_{-\infty}^{\infty} s_{in}(\tau) \cdot \underbrace{\frac{1}{2\cdot\pi} \cdot \int_{-\infty}^{\infty} W(\omega) \cdot e^{j\omega(t-\tau)} \cdot d\omega}_{\text{Invers Fourier transform of } W(\omega) = w(t-\tau)} \cdot d\tau$$

$$= \int_{-\infty}^{\infty} s_{in}(\tau) \cdot w(t-\tau) \cdot d\tau$$

$$= s_{in}(t) \otimes w(t)$$

In equation (1) the symbol ⊗ symbolize convolution. The principle of convolution is well known to the skilled person and can be further studied e.g. in "The Fourier Transform and its Applications", McGraw-Hill Higher Education, 1965 written by Ronald N. Bracewell.

The symbols used above and henceforth in the description have the following meaning:

ω=angular frequency (2·π·f)
$\omega_q$=discrete angular frequency at frequency $f_q$
w(t)=time domain weighting function
$W_{n,q}$=time domain weighting coefficient equal to component q of the IFT of row n in W
w=Matrix consisting of the weighting coefficients $W_{n,q}$ (n∈[1 . . . N], q∈[0 . . . Q−1]) with a row for each antenna element and a column for each spectral component
w(t−τ)=time delayed time domain weighting function
W(ω)=frequency domain weighting function being the Fourier Transform of w(t)
$W_{n,q}$=W(ω) at ω=$\omega_q$ corresponding to spectral component q in auxiliary antenna element n
W=Matrix consisting of the elements $W_{n,q}$ (n∈[1 . . . N], q∈[0 . . . Q−1])
A(ω)=absolute value of W(ω)
$a_{n,q}$=A(ω) at ω=$\omega_q$ corresponding to the absolute value of spectral component q in auxiliary antenna element n equal to the absolute value of $W_{n,q}$
τ=time delay and integration variable
τ(ω)=time delay as a function of ω
$\tau_{n,q}$=time delay of τ(ω) at ω=$\omega_q$ corresponding to spectral component q in auxiliary antenna element n
φ(ω)=phase shift as a function of ω
$\phi_{n,q}$=phase shift of φ(ω) at ω=$\omega_q$ corresponding to spectral component q in auxiliary antenna element n
$S_{Mq}$=Spectral component q from the main antenna
$S_M$=Row vector consisting of the elements $S_{Mq}$(q∈[0 . . . Q−1]) being the FT of the output waveform of the main antenna
$S_{n,q}$=Spectral component q from the auxiliary antenna n
S=Matrix consisting of the elements $S_{n,q}$(n∈[1 . . . N], q∈[0 . . . Q−1])
$P_q$=Residual power in spectral component q of the output waveform z
P=Row vector consisting of the elements $P_q$(q∈[0 . . . Q−1])
$Z_q$=Spectral component q of the output waveform z
Z=Vector consisting of the elements $Z_q$ (q∈[0 . . . Q−1])
z=Output waveform in the time domain The weighting elements and weighting coefficients mentioned above are examples of control parameters.

Vectors and matrixes are designated with bold characters.

As mentioned above $\tau_{n,q}$ and $a_{n,q}$ are examples of frequency dependent control parameters for auxiliary antenna element n affecting each spectral component q. The phase shift $\phi_{n,q}$ is another example of a frequency dependent parameter for auxiliary antenna element n affecting each spectral component q.

This embodiment clarifies an important difference between the inventive solution and prior art. In prior art solutions the total output waveform from each antenna element in the auxiliary antenna is treated by affecting phase and amplitude. This treatment is the same over the entire frequency range, i.e. it is frequency independent. In this embodiment of the inventive solution each waveform from the auxiliary antenna elements is divided into a number of spectral components and each spectral component is affected by one or several control parameters depending on frequency. This makes it possible to accurately control gain and delay or phase of each spectral component and thus also to accurately control gain and delay or phase over the total bandwidth B.

Figure 3B:
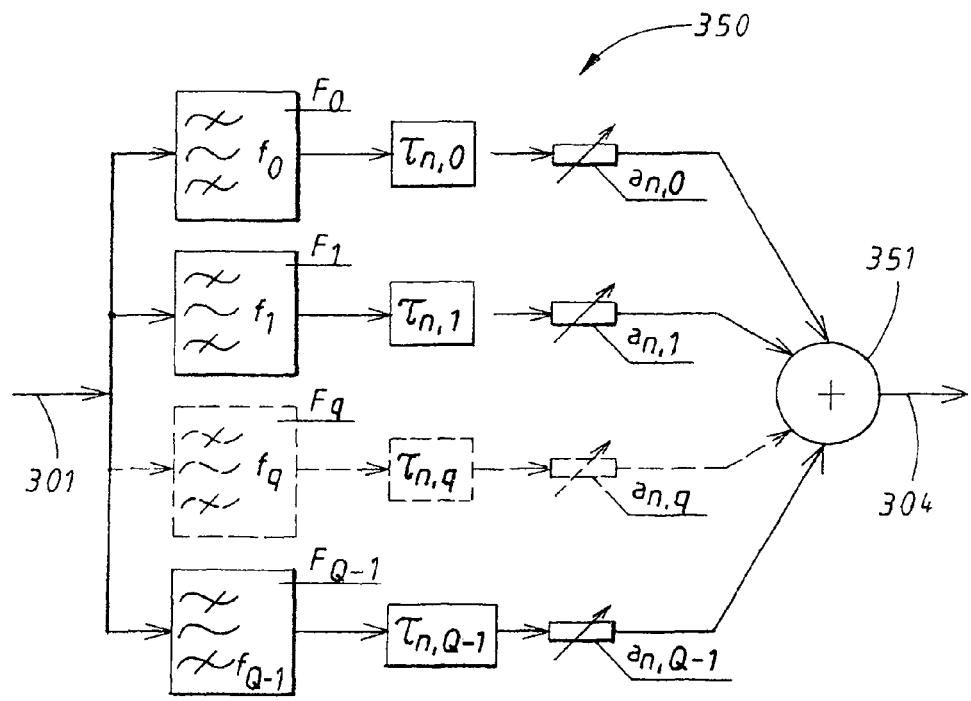
FIG. 3b schematically shows an analogue solution of a realization in the frequency domain of a transforming means.

FIG. 3a describes a digital realization of the transforming means. FIG. 3b shows a corresponding analogue realization with the input waveform $s_{in}$(t) 301 entering a third control element 350. The input waveform 301 coming from auxiliary antenna element n is fed to Q band pass filters $F_q$ having a centre frequency $f_q$ where q assumes integer values from 0 to Q−1. The input waveform 301 is thus split in Q spectral components and a time delay $\tau_{n,q}$ or alternatively a phase shift $\phi_{n,q}$ and a frequency dependent attenuation/amplification $a_{n,q}$ are affecting each spectral component through any suitable time delay or phase shift and attenuation/amplification means well known to the skilled person. All spectral components are connected to a second summation network 351 producing the output waveform $s_{out}$(t), 304. The centre frequency $f_q$ of each spectral component can be calculated according to:

$$f_q = f_c - \frac{B}{2} + \left(q + \frac{1}{2}\right) \cdot \frac{B}{Q}$$

for a case with equividistant spectral component division, where $f_c$ is the centre frequency in the total frequency band and B is the total bandwidth.

The third control element 350 comprises Q band pass filters $F_q$, means for time delay and amplification/attenuation as well as the second summation network 351.

A further digital realization of the transforming means will now be described with reference to FIGS. 4a and 4b. In many situations a time discrete realization, with discrete steps T in time, might be preferable. An output waveform $s_{out}$(m·T), representing one of the output waveforms $s_1'$ to $s_N'$, emitted from a second control element (400) can be calculated with the aid of equation (2) as a function of an input waveform $s_{in}$(m·T), representing one of the input waveforms $s_1$ to $s_N$, entering the second control element. The index m is an integer value increasing linearly as a function of time. W($\omega_q$) represents the time delay and attenuation/amplification at the centre frequency of spectral component q, see FIG. 3. The FFT and the IFFT described in association with FIG. 3a, both requiring Q·$\log_2$(Q) operations, are computational efficient methods for calculation of DFT (Discrete Fourier Transform) and IDFT (Inverse Discrete Fourier Transform), both requiring $Q^2$ operations. Q is as mentioned above the total number of spectral components. The output waveform is calculated as:

$$s_{out}(m \cdot T) = \underbrace{\frac{1}{Q} \cdot \sum_{q=0}^{Q-1} W(\omega_q) \cdot \underbrace{\sum_{k=0}^{Q-1} s_{in}(k \cdot T) \cdot e^{-j \cdot 2 \cdot \pi \cdot k \cdot \frac{q}{Q}}}_{DFT \text{ of the input signal } s_{in}(mT)} \cdot e^{j \cdot 2 \cdot \pi \cdot q \cdot \frac{m}{Q}}}_{IDFT \text{ back to the time domain}} \quad (2)$$

$$= \sum_{k=0}^{Q-1} s_{in}(k \cdot T) \cdot \underbrace{\frac{1}{Q} \cdot \sum_{q=0}^{Q-1} W(\omega_q) \cdot e^{j \cdot 2 \cdot \pi \cdot q \cdot \frac{m-k}{Q}}}_{IDFT[W(\omega_q)] = w_{mod[(m-k),(Q-1)]}}$$

$$= \sum_{k=0}^{Q-1} s_{in}(k \cdot T) \cdot w_{mod[(m-k),(Q-1)]}$$

$$= s_{in}(m \cdot T) \otimes w_{mod[m,(Q-1)]}$$

mod [x,y]=remainder after division of x by y
$\omega_q$=2·π·$f_q$=discrete angular frequency
Q=Number of spectral components
k=integer raising variable used in the DFT and the IDFT
m=integer raising variable for discrete time steps q=integer raising variable for spectral components and integer raising variable used in the DFT.

$W(\omega_q)$=frequency domain weighting function for frequency $f_q$ being the Fourier Transform of $W_{n,q}$ for auxiliary antenna element n.

As can be seen in equation (2) the desired functionality in a time discrete realization can be achieved with Q operations.

FFT and DFT are different methods for Fourier Transformation (FT). IFFT and IDFT are corresponding methods for Inverse Fourier Transformation (IFT). As described above these methods have different advantages and the method most suitable for the application is selected. However any of the methods can be used when FT and/or IFT are/is required in the different embodiments of the invention.

Figure 4A:
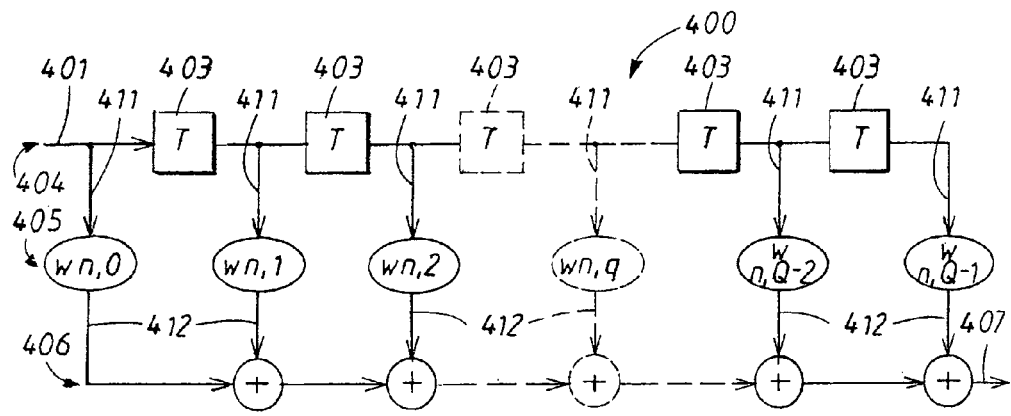
FIG. 4a schematically shows a realization of a transforming means in the time domain.

FIG. 4a shows the input waveform $s_{in}(m \cdot T)$ 401, coming from an antenna element in the auxiliary antenna. The input waveform 401 is successively time delayed in Q-1 time steps T, 403, numbered from 1 to Q-1 and being time delayed copies of the input waveform $s_{in}(m \cdot T)$. The input waveform is thus successively time delayed with time steps T as illustrated in the upper part, 404, of FIG. 4a. Q control parameters comprising weighting coefficients $w_{n,0}$ to $w_{n,Q-1}$, for auxiliary antenna element n is identified with two indexes, the first representing auxiliary antenna element number and the second a consecutive number q representing a spectral component and ranging from 0 to Q-1. The weighting coefficients are calculated for each antenna element n as the IDFT of $W(\omega_q)$ or alternatively as the IFFT of $W(\omega_q)$ for the Q spectral components q, resulting from dividing the bandwidth B in q components. The weighting coefficients in the time domain $w_{n,0}$ to $w_{n,Q-1}$ thus is the weighting coefficient for antenna element n in the auxiliary antenna. The corresponding coefficients in the frequency domain are designated $W_{n,q}$. The arrows 411 illustrate that the input waveform $s_{in}(m \cdot T)$ is multiplied with the first weighting coefficient $w_{n,0}$ and each time delayed copy of the input waveform is successively multiplied with the weighting coefficient having the same second index as the number of time step delays T included in the time delayed copy of the input waveform as illustrated in the middle part, 405, of FIG. 4a. The result of each multiplication is schematically illustrated to be moved, indicated with arrows 412, to the bottom part, 406, of FIG. 4a, where each multiplication result is summed to provide the output waveform 407, $s_{out}(m \cdot T)$.

If the dominating part of the time delay is not frequency dependent, which is often the case when there is a physical distance between the main antenna and the auxiliary antenna, it will result in many very small consecutive weighting coefficients, approximately equal to zero, at the beginning and end of the series of weighting coefficient $w_{n,0}$ to $w_{n,Q-1}$ for each antenna element in the auxiliary antenna. Assume that the first x weighting coefficients and the last y weighting coefficients in the series of weighting coefficients $w_{n,0}$ to $w_{n,Q-1}$ are approximately equal to zero. It could then be suitable in a hardware realization, to set the first x weighting coefficients and the last y weighting coefficients to zero and to integrate the first x time delays T into a time delay D, 402, equal to $x \cdot T$ as illustrated in FIG. 4b, and to exclude the last y multiplications to reduce the number of required operations to less than Q operations. FIG. 4b otherwise corresponds to FIG. 4a. The time delay D, 402, corresponds to the non frequency dependent time delay, for each antenna element in the auxiliary antenna. The remaining frequency dependent time delay will onwards be called "delta time delay". FIG. 4b is an example of a computational efficient convolution, for calculation of the "delta time delay", preceded of the frequency independent time delay D, 402, used mainly to compensate for the physical distance between the main antenna and the auxiliary antenna. Compensation for this physical distance is made relative to the non frequency dependent delay line, 212. The delay time of the non frequency dependent delay line, 212 must correspond to the maximum time difference or delay of the jamming signals in the main antenna and the auxiliary antenna caused by the physical distance between the main antenna and the auxiliary antenna.

The means for realizing the frequency independent time delay D and the means for frequency dependent time delays and attenuations/amplifications are parts of the second control element 400.

The first 300, second 400 and third 350 control elements are examples of transforming means. In an alternative embodiment with a common IFT, which will be explained below, the IFT part does not have to be included in the digital transforming means and the second summation network 351 does not have to be included in the third control element.

Figure 4B:
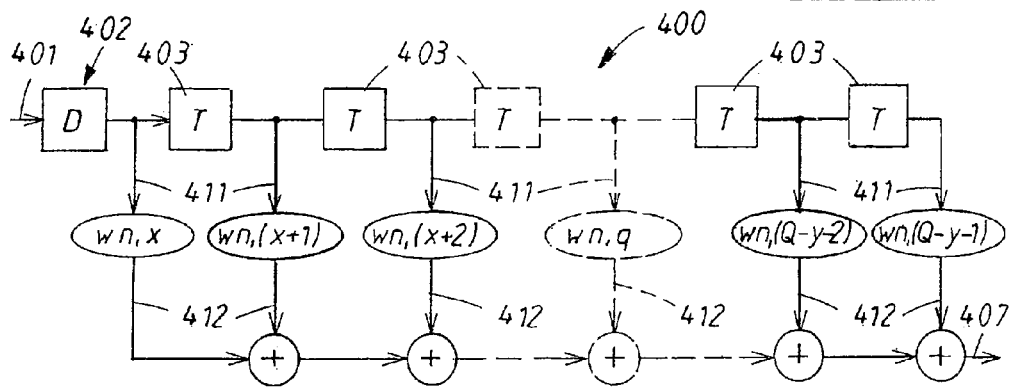
FIG. 4b schematically shows a realization in the time domain for an embodiment of the transforming means including also a dominating non frequency dependent "true time delay".
Figure 4C:
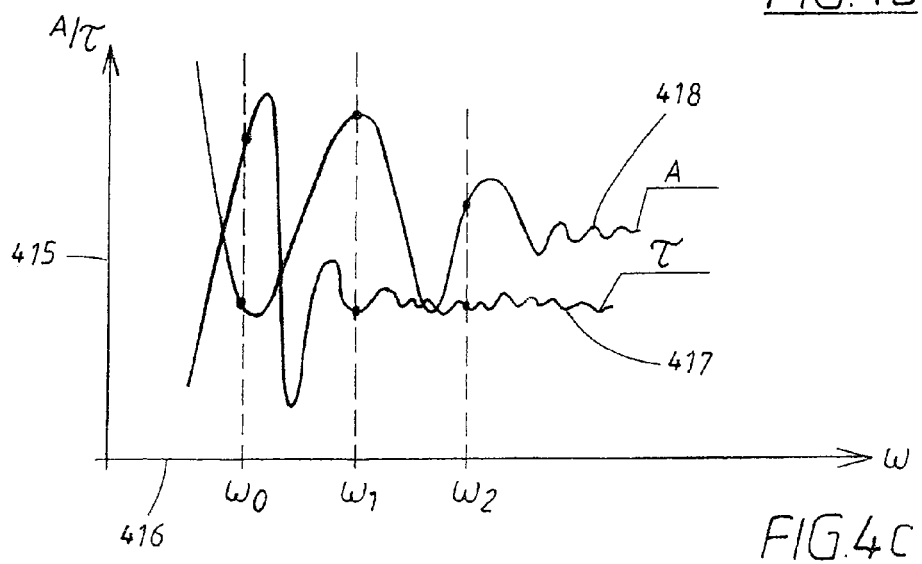
FIG. 4c shows a diagram of attenuation/amplification and time delays as a function of angular frequency ω(2·π·f).

FIG. 4c shows the angular frequency dependency of the time delay $\tau(\omega)$ and attenuation $A(\omega)$ on the vertical axis 415 as a function of the angular frequency $\omega$ (i.e. $2 \cdot \pi \cdot f$) on the horizontal axis 416. The optimum weighting function is estimated for each auxiliary antenna element n and for a number of $\omega$-values, $\omega_0, \omega_1, \omega_2 \ldots \omega_{Q-1}$ for example by minimizing the output residual power from the Cancellation Network (CN) for each spectral component q. The output waveform z (207) is the difference between the delayed output waveform (211) from the main antenna and the sum of the waveforms $s_1'$ to $s_N'$ (209) when the subtraction is made in the time domain. All jammer signals as well as the useful signal will be present in both the waveform from the main antenna and the waveforms $s_1$ to $s_N$ from the elements in the auxiliary antenna with varying time delays and strengths. By minimizing the output residual power from the Cancellation Network (CN) for each spectral component q the jammer influence on the output waveform z (207) will be minimized. To simplify the measurement of the residual power for each spectral component the first summation network and the Cancelling Network could be duplicated for each spectral component thus using Q single spectral first summation networks and Q single spectral Cancellation Networks. This results in one feedback waveform for each spectral component fed to the ASC. The output waveform z, 207, is then formed as the IFT of all spectral components after the single spectral Cancellation Networks.

The described calculation is performed for each spectral component q. This results in a number of values $W_{n,0}, W_{n,1}, W_{n,2} \ldots W_{n,Q-1}$ for each auxiliary antenna element n. The time delay as a function of $\omega$ then forms a curve 417 and the attenuation/amplification a curve 418. The weighting coefficients $W_{n,0}, W_{n,1}, W_{n,2} \ldots W_{n,Q-1}$ are calculated as the IDFT or IFFT of $W_{n,0}, W_{n,1}, W_{n,2} \ldots W_{n,Q-1}$ for each auxiliary antenna element n.

FIGS. 4a and 4b thus shows a realization of a frequency dependent time delay and attenuation/amplification in the time domain and FIGS. 3a and 3b shows a corresponding realization in the frequency domain. An advantage with the realization in the time domain is that only Q operations are required while the realization in the frequency domain requires $Q \cdot \log_2(Q)$ operations as described above.

All three control elements could as mentioned earlier be inserted either at video, intermediate frequency (IF) or directly on radio frequency (RF) level. It is easier to realize the control element at lower frequency but all hardware needed between the control element and the antenna element/sub array in the auxiliary antenna need to be multiplied with the number of antenna elements/sub arrays in the auxiliary antenna. It should also be noted that the Cancellation Network (CN) and all hardware in the SLC must have a dynamic range wide enough to handle the jammer influence of the received waveform. In the description the invention is henceforth described as being realized at the RF level.

The three control elements are examples of transforming means, transforming an input waveform to an output waveform. The transforming means all have two ends, an input end receiving the input waveform and an output end producing the output waveform.

Returning to FIG. 2, the Side Lobe Canceller (SLC) 200 will now be described in more detail. Each antenna element $A_1$-$A_N$ in the auxiliary antenna is in principal used to cancel the side lobe interference in a certain direction as will be explained below. The auxiliary antenna can be part of the main antenna or separated from the main antenna. The main antenna can be an array antenna with a number of antenna elements or any other type of antenna. Jammer signals are emitted from jammer sources J1 and J2 and picked up by the main antenna and the auxiliary antenna. The waveform 205 from the main antenna is fed both to the Adaptive Side lobe Canceller (ASC) control unit 203 and to a Cancellation Network 204 via the delay line 212. The waveforms $s_1$ to $s_N$ from each antenna elements 1 to N in the auxiliary antenna are fed to the Adaptive Side lobe Canceller (ASC) control unit 203. The waveform $s_1$ is also fed to transforming means unit 1, $Tr_1$, the waveform $s_2$ to transforming means unit 2, $Tr_2$, and the waveform $s_n$ to transforming means unit n, $Tr_n$, i.e. each waveform $s_1$ to $s_N$ is fed to corresponding transforming means unit $Tr_1$ to $Tr_N$. The optimum control parameters W could be estimated by minimizing the residual power in each spectral component q of the difference between each spectral component of the delayed waveform from the main antenna $S_{Mq}$ and the sum of spectral component q from each output waveform $s_1'$ to $s_N'$. The output residual power P can be calculated as:

$$P = E[|Z|^2] = E[|S_M^T - W^T \cdot S|^2]$$

Where:
E[x]=Vector containing the expected value of each element in the vector x
|x|=Vector containing the absolute value of each element in the vector x
$X^T$=Transponat of the matrix X
In the second equality:

$$E[|Z|^2] = E[|S_M^T - W^T \cdot S|^2]$$

only the weighting elements W are unknown. This relation together with minimization of $E[|Z|^2]$ for all spectral components q can thus be used for calculation of W. When the total residual power P for all spectral components of the output waveform z is minimized the influence of the jammer signal/signals is also minimized, in all practical situations when cancellation is required. The signal to noise ratio of the output waveform z is, during these circumstances, maximized by the operations described above.

Control parameters equal to row 1 to row N of W or row 1 to row N of w depending on the chosen realization of the transforming means as explained above, is sent to corresponding transforming means $Tr_1$ to $Tr_N$ via control signals $c_1$ to $c_N$. In the transforming means the control parameters are received and implemented in means for achieving the frequency dependent time delay or frequency dependent phase shift and the frequency dependent amplification/attenuation when the invention is implemented in the frequency domain or in the means for achieving the multiplication with the weighting coefficients $W_{n,0}$ to $W_{n,Q-1}$ when the invention is implemented in the time domain. $W_{n,q}$ is the weighting function for antenna element n for delay q used when the invention is implemented in the time domain and $W_{n,q}$ is equal to component q of the FT of row n in w used when the invention is implemented in the frequency domain as explained above. The outputs $s_1'$ to $s_N'$ from all transforming means, one or several, are added together in the first summation network 206 creating the summed output waveform 209. The output waveform 209 from the first summation network 206 is fed to the Cancellation Network 204 where it is subtracted from the delayed output waveform 211 from the main antenna. The resulting difference is an output waveform 207 from the Cancellation Network which is fed back to the ASC and also transmitted to the radar system as is the case in the described application.

When the invention is implemented in the frequency domain the above described summation and subtraction could alternatively be done for each individual spectral component q followed by one final Inverse Fourier Transform (IFT) forming the output waveform z. Giving the advantage of less required dynamic range since over-excitation of one or a few spectral components will degrade performance gracefully compared to over-excitation in the time domain resulting in a severe performance drop over the entire bandwidth. In this alternative solution there will, instead of one first summation network, be Q single spectral first summation networks, one for each spectral component from the antenna elements in the auxiliary antenna and Q single spectral Cancellation Networks where each spectral component of the delayed output waveform of the main antenna is subtracted with the corresponding spectral component from the auxiliary antenna summed in respective single spectral first summation network. An IFT is then performed on the waveforms of the resulting spectral components to produce the output waveform z 207. The advantage with this solution is that an IFT is not required in the transforming means but an FT has to be made of the delayed output waveform 211 from the main antenna to produce the spectral components fed to the single spectral Cancellation Networks.

The delayed output waveform 211 and the output waveforms from the transforming means can thus be either in the time domain or in the frequency domain divided in Q spectral components.

The ASC continuously updates the control parameters contained in the matrix W or w, in order to maximize the signal to noise ratio (S/N) of the output waveform 207 from the Cancellation Network 204. This is accomplished by continuous recalculation of all control parameters as described above. The advantage with using the invention is that the output waveform 209 from the first summation network 206 can be made valid over the entire bandwidth B thereby enabling cancellation of unwanted disturbances picked up from side lobes of the main antenna over the entire operating bandwidth B of the main antenna.

Figure 5:
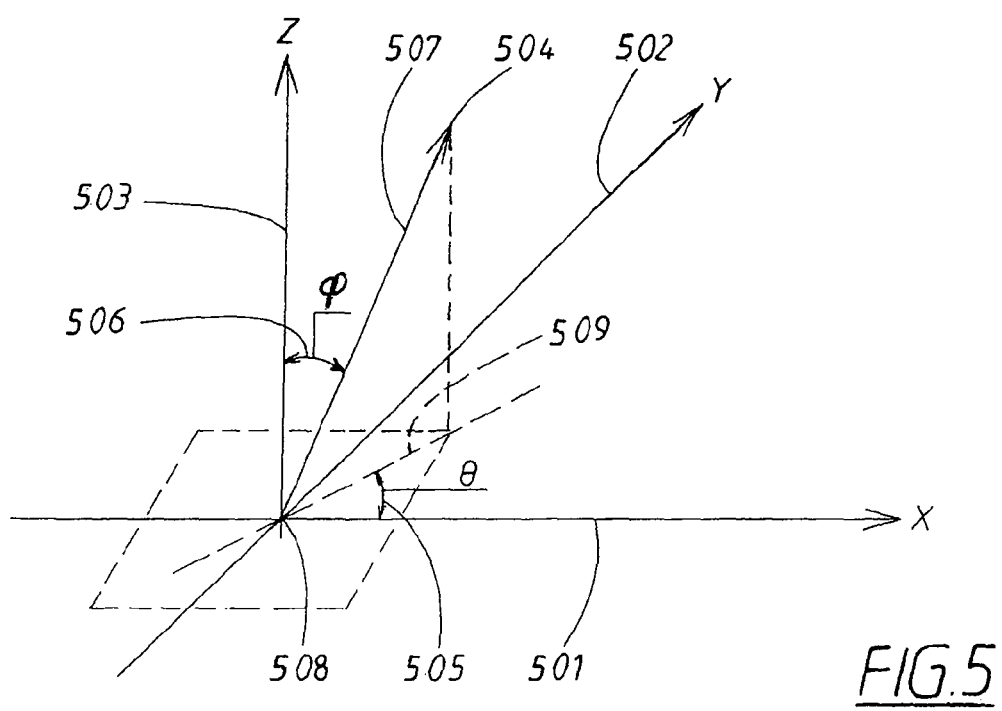
FIG. 5 shows the definition of angles φ and θ used in the definition of the antenna pattern.

The angles θ and φ are defined as illustrated in FIG. 5. In a Cartesian coordinate system with X-axis 501, Y-axis 502 and Z-axis 503 the direction to a point 504 in space is defined by an angle θ, 505, and an angle φ, 506. The angle φ is the angle between a line 507 from the origin 508 to the point 504 and the Z-axis. The angle θ is the angle between the vertical projection, 509, of the line 507 on the X-Y plane and the X-axis.

Figure 6:
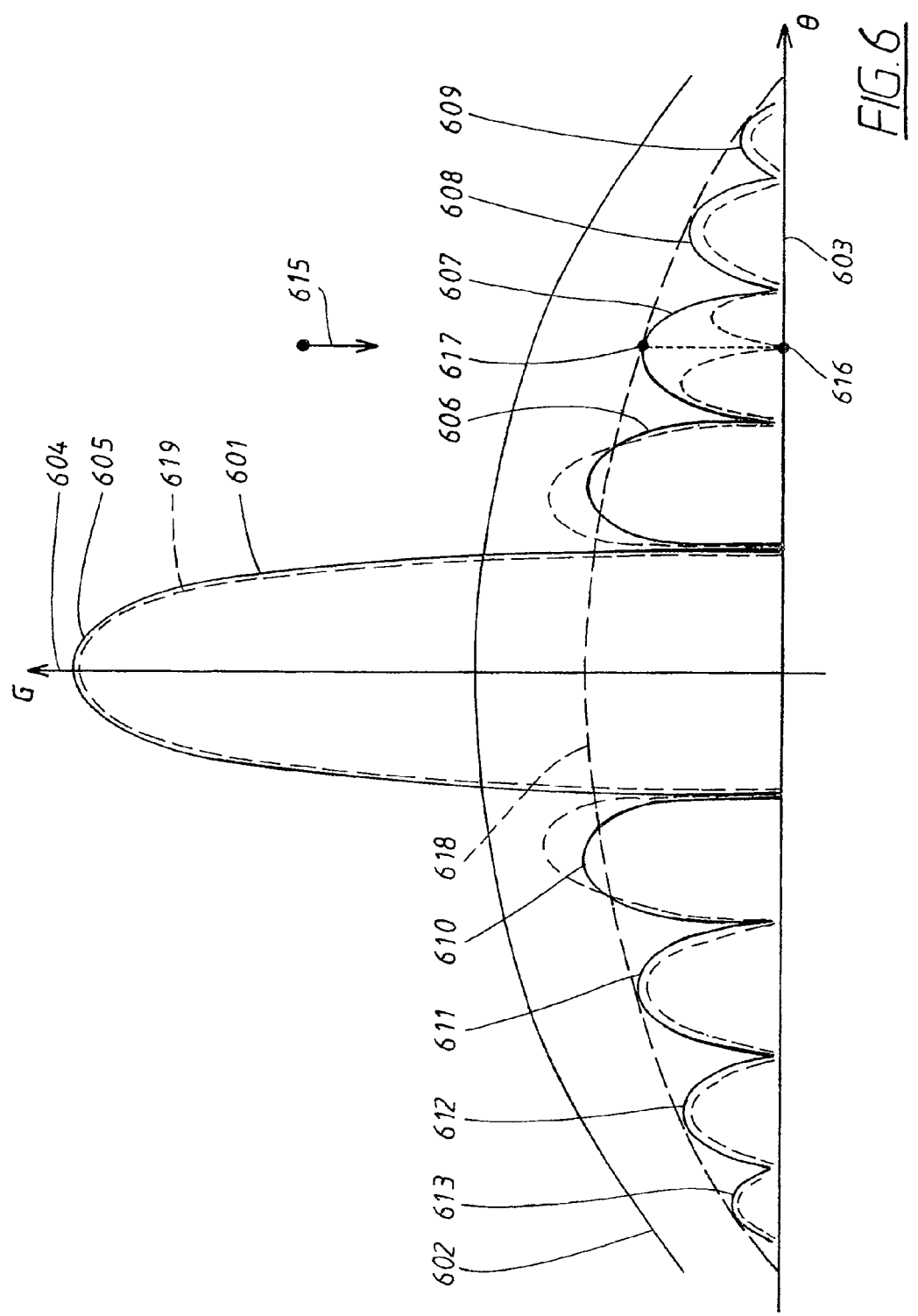
FIG. 6 schematically shows radiation patterns of a main antenna and an auxiliary antenna.

FIG. 6 shows an antenna pattern 601 of the main antenna and antenna pattern 602 of an antenna element in the auxiliary antenna as a function of the angle θ on the horizontal axis 603. The vertical axis 604 represents gain in dB. As can be seen the antenna pattern of the main antenna consists of a main lobe 605 and side lobes 606 to 613. The antenna pattern of the antenna element is fairly omni-directional and at a much lower level than the main lobe of the main antenna. A jammer waveform is now assumed from a jammer source 615 having an incident angle 616. The ASC is now calculating the control parameters from the waveform $W(\omega)=A(\omega)\cdot e^{-j\cdot\omega\cdot\tau(\omega)}$ or $W(\omega)=A(\omega)\cdot e^{-j\cdot\Phi(\omega)}$ according to the principles described above such that the amplitude of the antenna pattern in the antenna element in the auxiliary antenna is reduced to an amplitude level representing point 617 at jammer incident angle 616. This amplitude level corresponds to the amplitude level of the side lobe 607 at the angle 616. The control parameters are further calculated such that phase of the main antenna and the antenna element will be equal at point 617 by minimizing the residual power in each spectral component q of the output waveform z. The thus modified antenna pattern of the antenna element is shown with the dashed curve 618. Both gain and phase are now adjusted in the antenna element of the auxiliary antenna to be equal to the main antenna in the desired cancellation direction. The output waveforms $s_1'$ to $s_N'$ from the antenna elements are fed to the first summation network 206 where they are summed to provide a total auxiliary antenna output waveform 209 which is fed to the Cancellation Network where it is subtracted with the delayed output waveform 211 of the main antenna resulting in a waveform cancellation in the direction 616 in the output waveform 207 corresponding to a resulting main antenna pattern 619. In the embodiment of FIG. 6 there is just one antenna element in the auxiliary antenna and thus only one output waveform $S_1'$ which is fed directly to the Cancellation Network as there is no need for a first summation network in this embodiment. In another embodiment of the invention, as explained earlier, the first summation network and the Cancellation network can be substituted with Q single spectral first summation networks and Q single spectral Cancellation networks when a final IFT is made after the summation and cancellation calculations.

The functions of the first summation network can also be integrated in the CN. In this embodiment each output waveform from the transforming means $s_1'$ to $s_N'$ is directly fed to the CN.

As can be seen in FIG. 6 the main lobe of the main antenna will only be marginally affected as the gain level of the antenna elements in the auxiliary antenna is far below the level of the main lobe. The resulting side lobe levels can be either increased or decreased depending on the phase differences between the antenna element and the main antenna at the angle in question. As mentioned earlier the advantage with the invention is that by using the control parameters described above it will be possible to achieve the cancellation over the entire wideband B.

Figure 7:
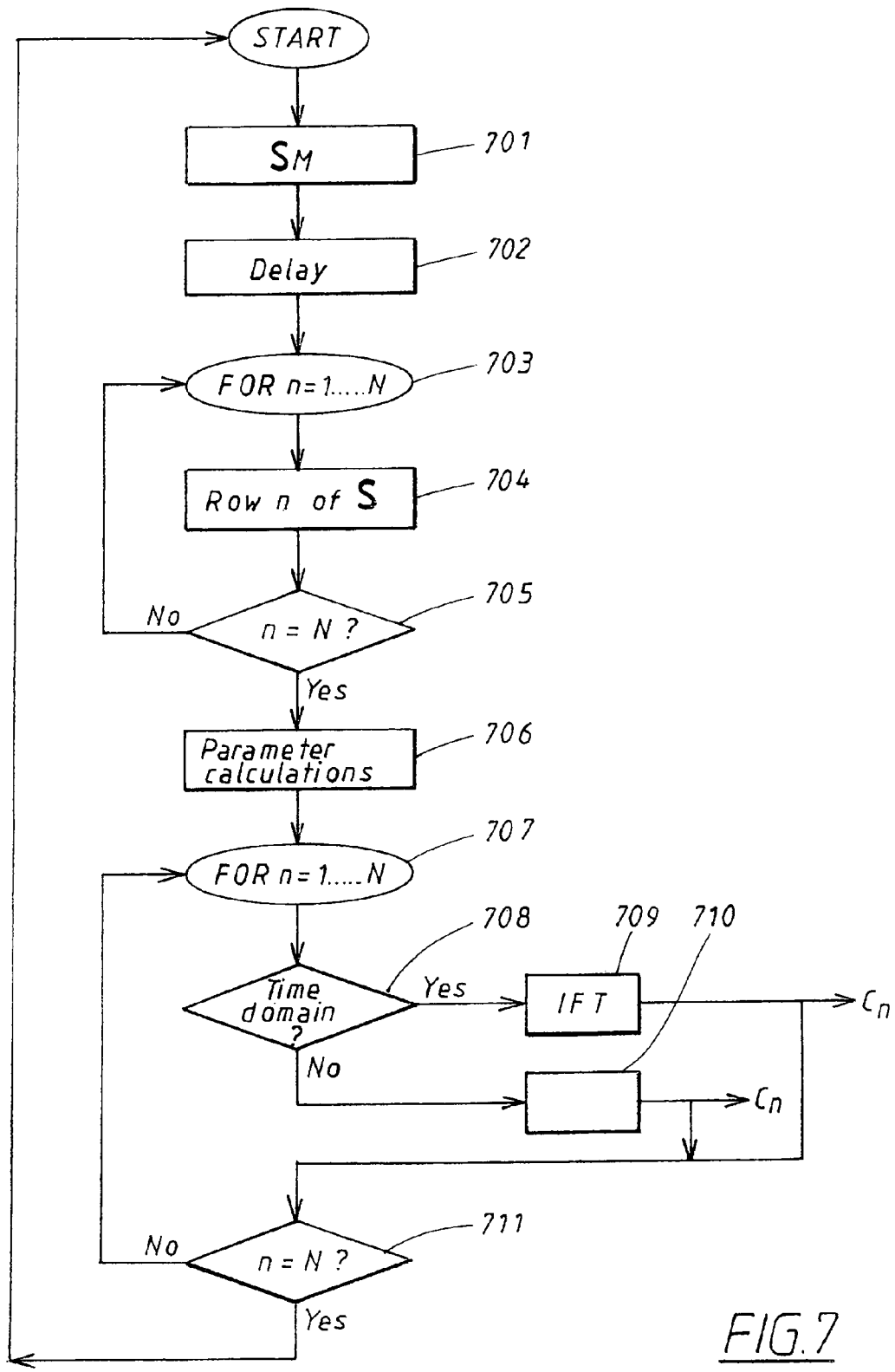
FIG. 7 schematically shows a flow chart of the calculations to obtain the control signals.

The method of various embodiments of the invention are shown in FIG. 7. All calculations in the embodiment of FIG. 7 are performed in the ASC. In 701, after the START the row vector $S_M$ consisting of the elements $S_{Mq}$ ($q\in[0\ldots Q-1]$) being the FT of the output waveform of the main antenna is calculated. In 702 a delay compensation is applied to the row vector $S_M$ by adjusting the phase of each spectral component. In 703, n is set to 1 and in 704, row n of the S matrix is calculated. The S matrix consists of the elements $S_{n,q}$ ($n\in[1\ldots N]$, $q\in[0\ldots Q-1]$) where $S_{n,q}$ is the spectral component q of the auxiliary antenna n. In 705, a check is made if n=N, if not a return is made to 703 where n is increased with 1 and a new row in the S matrix is calculated in 704. This loop 703 to 705 continues until the check in 705 results in n=N. When this occurs all rows in the S matrix are calculated and the calculations proceed to 706, where the W matrix consisting of the elements $W_{n,q}$ ($n\in[1\ldots N]$, $q\in[0\ldots Q-1]$) is calculated while minimizing the output residual power $P=E[|Z|^2]=E[|S_M^T-W^T\cdot S|^2]$. When the W matrix is calculated a new n-loop is started in 707 setting n=1. If a time domain realization is chosen a decision is made in 708 to proceed to 709 where an IFT is made of row n of the W matrix resulting in an output from 709 being the control signal $c_n$. If a time domain realization is not chosen in 708, i.e. a frequency domain solution is chosen, row n of the W matrix is used in 710 as the control signal $c_n$. When a $c_n$ signal has been produced in either 709 or 710 a check is made in 711 if n=N, if not the loop continues in 707 by increasing the value of n and proceeding in the loop 707, 708, 709/710 and 711 until the check in 711 results in n=N. When n=N all control signals $c_1$ to $c_N$ have been calculated and the calculation starts all over again by making a new calculation of the row vector $S_M$ in 701. As explained above the control parameters equal to row 1 to row N of W or row 1 to row N of w depending on the chosen realization of the transforming means, are sent to corresponding transforming means $Tr_1$ to $Tr_N$ via the control signals $c_1$ to $c_N$.

The invention is not limited to the embodiments above, but may vary freely within the scope of the appended claims.

The invention claimed is:

1. A method to suppress side lobes of a main antenna using a side lobe canceller (SLC), the SLC comprising an auxiliary antenna and an Adaptive Side lobe Canceller control unit (ASC), the auxiliary antenna having N antenna elements, where the antenna element may also be a sub array, 1 to N, N being $\geq 1$, and a feedback loop from an output terminal of the SLC to the ASC, the method comprising:
   using the ASC, receiving a main antenna output waveform from the main antenna;
   using the ASC, receiving auxiliary antenna output waveforms $s_1$ to $s_N$ from the respective antenna elements or sub arrays of the auxiliary antenna;
   transforming the auxiliary antenna output waveforms using respective transforming units $Tr_1$ to $Tr_N$ to provide transformed auxiliary antenna output waveforms;
   delaying the main antenna output waveform to provide a delayed output waveform of the main antenna; and
   calculating a respective weighting function $W(\omega)$ for Q spectral components indexed by an integer q ranging from 0 to Q−1, the Q spectral components obtained via dividing a bandwidth B into Q components for each antenna element or sub array, the respective weighting function $W(\omega)$ calculated using a criterion to minimize a jamming influence on a side-lobe-suppressed main antenna output waveform from the SLC; and
   wherein the transforming the auxiliary antenna output waveforms includes using one or more control parameters calculated from the respective weighting function $W(\omega)$ at discrete angular frequencies $\omega_q$ using the ASC; and
   wherein, using the ASC, the one or more control parameters are calculated on a recurring basis and provided via respective control signals $c_1$ to $C_N$ for use in transforming the auxiliary antenna output waveforms; and
   wherein the method includes subtracting the transformed auxiliary antenna output waveforms in the time or frequency domain from the delayed output waveform of the main antenna to provide the side-lobe-suppressed main antenna output waveform from the SLC having reduced jamming influence over the bandwidth B.

2. The method of claim 1, wherein the weighting function is $W(\omega)=A(\omega)\cdot e^{-j\cdot\omega\cdot\tau(\omega)}$ or $W(\omega)=A(\omega)\cdot e^{-\Phi(\omega)}$.

3. The method of claim 1, wherein the criterion to minimize the jamming influence includes minimizing an output residual power of the side-lobe-suppressed main antenna output waveform.

4. The method of claim 1, comprising:
  for each row n of an S matrix, on a recurring basis, Fourier transforming (FT) the main antenna output waveform to calculate a row vector $S_M$ including elements $S_{SMq}$ (q∈ [0...Q−1]) and applying a delay compensation to the row vector $S_M$;
  on a recurring basis, calculating a W matrix including elements $W_{n,q}$ (n∈[1...N], q∈[0...Q−1]) including minimizing an output residual power of the side-lobe-suppressed main antenna output waveform according to a relation $P=E[|Z|^2]=E[|S_M^T - W^T \cdot S|^2]$; and
  wherein calculating the control signals $c_1$ to $c_N$ on a recurring basis includes inverse-Fourier transforming rows 1 to N of the W matrix and using these rows as control signals when a time domain realization is used, or using the row 1 to N of the W matrix as the control signals $C_1$ to $c_N$ when a frequency domain realization is used.

5. The method of claim 1, comprising feeding transformed auxiliary antenna output waveforms $S_1'$ to $s_N'$ to a Cancellation Network (CN) via a first summation network.

6. The method of claim 1, comprising Fourier transforming respective auxiliary antenna output waveforms $s_{in}(t)$ via respective transforming units to provide respective sets of Q spectral components, 0 to (Q−1), each spectral component having a center frequency $f_q$, and frequency dependent parameters time delay $\tau_{n,q}$ or phase shift $\phi_{n,q}$ applied to each spectral component q;
  applying an amplification or attenuation factor, $a_{n,q}$, to each spectral component q; and
  inverse Fourier transforming (IFT) respective sets of Q spectral components via respective transforming units back into the time domain to provide respective output waveforms $s_{out}(t)$ from each transforming unit.

7. The method of claim 1, comprising:
  successively time delaying auxiliary antenna output waveforms $s_{in}(m \cdot T)$ via respective transforming units in Q−1 time steps T, from 1 to Q−1 to provide time delayed copies of the auxiliary antenna output waveform $s_{in}(m \cdot T)$;
  calculating, via respective transforming units, Q parameters comprising weighting coefficients $w_{n,0}$ to $w_{n,Q-1}$ for antenna element n, identified with two indexes, the first corresponding to the antenna element number, and the second corresponding to a consecutive number q representing a spectral component and ranging from 0 to Q−1, the Q parameters comprising weighting coefficients $w_{n,0}$ to $w_{n,Q-1}$ calculated via inverse Fourier transforming (IFT) $W(\omega) = A(\omega) \cdot e^{-j \cdot \omega \cdot \tau(\omega)}$ for the Q spectral components q, resulting from dividing the bandwidth B in Q components, the calculation being performed for each antenna element or sub array $(A_1 - A_N)$ by minimizing the jamming influence on the side-lobe-suppressed main antenna output waveform at a center frequency $f_q$ of each spectral component q; and
  multiplying, via respective transforming units, the auxiliary antenna output waveform $s_{in}(m \cdot T)$ with the first weighting coefficient $w_{n,0}$;
  successively multiplying, via respective transforming units, respective time delayed copies of the auxiliary antenna output waveform with the weighting coefficient having the same second index as the number of time step delays T included in the time delayed copy of the auxiliary antenna output waveform; and
  summing, via respective transforming units, the result of each multiplication to provide an output waveform $s_{out}(m \cdot T)$ from each transforming unit.

8. The method of claim 7, comprising reducing a number of operations to less than Q operations via (1) setting the first x weighting coefficients and the last y weighting coefficients in the series of weighting coefficients $w_{n,0}$ to $w_{n,Q-1}$ to zero, (2) integrating the first x time delays T into a time delay D, equal to $x \cdot T$, and (3) excluding the last y multiplications.

9. The method of claim 1, wherein the transformer units include an analog transforming unit.

10. The method of claim 1, comprising using Q single spectral first summation networks, one for each spectral component from the antenna elements in the auxiliary antenna and Q single spectral Cancellation Networks (CN) where each spectral component of the delayed output waveform of the main antenna is subtracted from the corresponding spectral component from the auxiliary antenna summed in the respective single spectral first summation network; and
  inverse Fourier transforming (IFT) the waveforms of the resulting spectral components to provide the side-lobe-suppressed main antenna output waveform.

11. A Side Lobe Canceller (SLC) comprising an auxiliary antenna and an Adaptive Side lobe Canceller control unit (ASC), the auxiliary antenna having N antenna elements, where the antenna elements may also be a sub array, 1 to N, N being $\geq 1$, and a feedback loop from an output terminal of the SLC to the ASC, the SLC configured to:
  receive a main antenna output waveform from a main antenna using the ASC;
  receive auxiliary antenna output waveforms $s_1$ to $s_N$ from the respective antenna elements or sub arrays of the auxiliary antenna using the ASC;
  delay the main antenna output waveform to provide a delayed output waveform of the main antenna; and
  calculate a respective weighting function $W(\omega)$ for Q spectral components indexed by an integer q ranging from 0 to Q−1, the Q spectral components obtained via dividing a bandwidth B into Q components for each antenna element or sub array, the respective weighting function $W(\omega)$ calculated using a criterion to minimize a jamming influence on a side-lobe-suppressed main antenna output waveform from the SLC;
  transform the auxiliary antenna output waveform using respective transforming units $Tr_1$ to $Tr_N$ to provide transformed auxiliary antenna output waveforms, the transforming units configured to use one or more control parameters calculated from the respective weighting function $W(\omega)$ at discrete angular frequencies $\omega_q$, wherein each output waveform $S_1$ to $S_N$ from the antenna elements or sub arrays of the auxiliary antenna is provided to the transforming units $Tr_1$ to $Tr_N$;
  calculate control parameters on a recurring basis;
  provide the calculated control parameters to the respective transforming units via respective control signals $c_1$ to $c_N$ for use in transforming the auxiliary antenna output waveforms; and
  subtract the transformed auxiliary antenna output waveforms in the time or frequency domain from the delayed output waveform of the main antenna to provide the side-lobe-suppressed main antenna output waveform from the SLC having reduced jamming influence over the bandwidth B.

12. The SLC of claim 11, wherein the weighting function is $W(\omega) = A(\omega) \cdot e^{-j \cdot \omega \cdot \tau(\omega)}$ or $W(\omega) = A(\omega) \cdot e^{-j \cdot \phi(\omega)}$.

13. The SLC of claim 11, wherein the criterion to minimize the jamming influence includes minimizing an output residual power of the side-lobe-suppressed main antenna output waveform.

14. The SLC of claim 11, wherein, the SLC is configured on a recurring basis to:
  Fourier transform (FT), for each row n of an S matrix, the main antenna output waveform to calculate a row vector $S_M$ including elements $S_{Mq}$ (q∈[0...Q−1]) and apply a delay compensation to the row vector $S_M$;
  calculate a W matrix including elements $W_{n,q}$ (n∈[1...N], q∈[0...Q−1]) including minimizing an output residual power of the side-lobe-suppressed main antenna output waveform according to a relation $P=E[|Z|^2]=E[|S_M^T - W^T \cdot S|^2]$; and
  calculate the control signals $c_1$ to $c_N$, via inverse-Fourier transforming (IFT) rows 1 to N of the W matrix and using these rows as control signals when a time domain realization is used, or using the row 1 to N of the W matrix as the control signals $c_1$ to $c_N$ when a frequency domain realization is used.

15. The SLC of claim 11, wherein the SLC is configured to provide transformed auxiliary antenna output waveforms $s_1'$ to $s_N'$ to a Cancellation Network (CN) via a first summation network.

16. The SLC of claim 11, wherein the respective transforming units comprise Fourier transforming (FT) units configured to FT respective auxiliary antenna output waveforms $s_{in}(t)$ to provide respective sets of Q spectral components, 0 to (Q−1), each spectral component having a center frequency $f_q$, and frequency dependent parameters time delay $\tau_{n,q}$ or phase shift $\phi_{n,q}$ applied to each spectral component q; and
  wherein the SLC is configured to apply an amplification or attenuation factor, $a_{n,q}$, to each spectral component q; and
  wherein the respective transforming units comprise Inverse Fourier transforming (IFT) units configured to inverse Fourier transform (IFT) respective sets of Q spectral components back into the time domain to provide respective output waveforms $s_{out}(t)$ from each transforming unit.

17. The SLC of claim 11, wherein the SLC is configured to:
  successively time delay auxiliary antenna output waveforms $s_{in}(m\cdot T)$ via respective transforming units in Q−1 time steps T, from 1 to Q−1 to provide time delayed copies of the auxiliary antenna output waveform $s_{in}(m\cdot T)$;
  calculate, via respective transforming units, Q parameters comprising weighting coefficients $w_{n,0}$ to $w_{n,Q-1}$ for antenna element n, identified with two indexes the first corresponding to the antenna element number and the second corresponding to a consecutive number q representing a spectral component and ranging from 0 to Q−1, the SLC configured to calculate Q parameters comprising the weighting coefficients $w_{n,0}$ to $w_{n,Q-1}$ via inverse Fourier transformation (IFT) of $W(\omega)=A(\omega)\cdot e^{-j\omega\tau(\omega)}$ for the Q spectral components q, resulting from dividing the bandwidth B in Q components, the calculation being performed for each antenna element or sub array ($A_1$−$A_N$) by minimizing the jamming influence on the side-lobe-suppressed main antenna output waveform at a center frequency $f_q$ of each spectral component q; and
  multiply, via respective transforming units, the auxiliary antenna output waveform $s_{in}(m\cdot T)$ with the first weighting coefficient $w_{n,0}$;
  successively multiply, via respective transforming units, respective time delayed copies of the auxiliary antenna output waveform with the weighting coefficient having the same second index as the number of time step delays T included in the time delayed copy of the auxiliary antenna output waveform; and
  sum, via respective transforming units, the result of each multiplication to provide an output waveform $s_{out}(m\cdot T)$ from each transforming unit.

18. The SLC of claim 17, wherein the SLC is configured to reduce a number of operations to less than Q operations via (1) setting the first x weighting coefficients and the last y weighting coefficients in the series of weighting coefficients $w_{n,0}$ to $w_{n,Q-1}$ to zero, (2) integrating the first x time delays T into a time delay D, equal to $x\cdot T$, and (3) excluding the last y multiplications.

19. The SLC of claim 11, wherein the transformer units include an analog transforming unit.

20. The SLC of claim 11, comprising Q single spectral first summation networks, one for each spectral component from the antenna elements in the auxiliary antenna and Q single spectral Cancellation Networks (CN); and
  wherein the SLC is configured to subtract each spectral component of the delayed output waveform of the main antenna from the corresponding spectral component from the auxiliary antenna summed in the respective single spectral first summation network; and
  wherein the SLC is configured to inverse Fourier transform (IFT) the waveforms of the resulting spectral components to provide the side-lobe-suppressed main antenna output waveform.

21. A method to suppress side lobes of a main antenna using a side lobe canceller (SLC), the SLC comprising an auxiliary antenna and an Adaptive Side lobe Canceller control unit (ASC), the auxiliary antenna having N antenna elements, where the antenna element may also be a sub array, 1 to N, N being ≧1, and a feedback loop from an output terminal of the SLC to the ASC, the method comprising:
  using the ASC, receiving a main antenna output waveform from the main antenna;
  using the ASC, receiving auxiliary antenna output waveforms $s_1$ to $s_N$ from the respective antenna elements or sub arrays of the auxiliary antenna;
  transforming the auxiliary antenna output waveforms using respective transforming units $Tr_1$ to $Tr_N$ to provide transformed auxiliary antenna output waveforms;
  delaying the main antenna output waveform to provide a delayed output waveform of the main antenna; and
  calculating a respective weighting function $W(\omega)$ for Q spectral components indexed by an integer q ranging from 0 to Q−1, the Q spectral components obtained via dividing a bandwidth B into Q components for each antenna element or sub array, the respective weighting function $W(\omega)$ calculated using a criterion to minimize a jamming influence on a side-lobe-suppressed main antenna output waveform from the SLC, wherein the criterion to minimize the jamming influence includes minimizing an output residual power of the side-lobe-suppressed main antenna output waveform,
  wherein the transforming the auxiliary antenna output waveforms includes using one or more control parameters calculated from the respective weighting function $W(\omega)$ at discrete angular frequencies $\omega_q$ using the ASC; and
  wherein, using the ASC, the one or more control parameters are calculated on a recurring basis and provided via respective control signals $c_1$ to $c_N$ for use in transforming the auxiliary antenna output waveforms; and
  wherein the method includes subtracting the transformed auxiliary antenna output waveforms in the time or frequency domain from the delayed output waveform of the main antenna to provide the side-lobe-suppressed main antenna output waveform from the SLC having reduced jamming influence over the bandwidth B, and further including:

successively time delaying auxiliary antenna output waveforms $s_{in}(m \cdot T)$ via respective transforming units in Q−1 time steps T, from 1 to Q−1 to provide time delayed copies of the auxiliary antenna output waveform $s_{in}(m \cdot T)$;

calculating, via respective transforming units, Q parameters comprising weighting coefficients $w_{n,0}$ to $w_{n,Q-1}$ for antenna element n, identified with two indexes, the first corresponding to the antenna element number, and the second corresponding to a consecutive number q representing a spectral component and ranging from 0 to Q−1, the Q parameters comprising weighting coefficients $w_{n,0}$ to $w_{n,Q-1}$ calculated via inverse Fourier transforming (IFT) $W(\omega) = A(\omega) \cdot e^{-j \cdot \omega \cdot \tau(\omega)}$ for the Q spectral components q, resulting from dividing the bandwidth B in Q components, the calculation being performed for each antenna element or sub array $(A_1-A_N)$ by minimizing the jamming influence on the side-lobe-suppressed main antenna output waveform at a center frequency $f_q$ of each spectral component q; and multiplying, via respective transforming units, the auxiliary antenna output waveform $s_{in}(m \cdot T)$ with the first weighting coefficient $w_{n,0}$;

successively multiplying, via respective transforming units, respective time delayed copies of the auxiliary antenna output waveform with the weighting coefficient having the same second index as the number of time step delays T included in the time delayed copy of the auxiliary antenna output waveform; and summing, via respective transforming units, the result of each multiplication to provide an output waveform $s_{out}(m \cdot T)$ from each transforming unit, and reducing a number of operations to less than Q operations via (1) setting the first x weighting coefficients and the last y weighting coefficients in the series of weighting coefficients $w_{n,0}$ to $w_{n,Q-1}$ to zero, (2) integrating the first x time delays T into a time delay D, equal to x·T, and (3) excluding the last y multiplications.

22. A Side Lobe Canceller (SLC) comprising an auxiliary antenna and an Adaptive Side lobe Canceller control unit (ASC), the auxiliary antenna having N antenna elements, where the antenna elements may also be a sub array, 1 to N, N being ≥1, and a feedback loop from an output terminal of the SLC to the ASC, the SLC configured to:

receive a main antenna output waveform from a main antenna using the ASC;

receive auxiliary antenna output waveforms $s_1$ to $s_N$ from the respective antenna elements or sub arrays of the auxiliary antenna using the ASC;

delay the main antenna output waveform to provide a delayed output waveform of the main antenna; and calculate a respective weighting function $W(\omega)$ for Q spectral components indexed by an integer q ranging from 0 to Q−1, the Q spectral components obtained via dividing a bandwidth B into Q components for each antenna element or sub array, the respective weighting function $W(\omega)$ calculated using a criterion to minimize a jamming influence on a side-lobe-suppressed main antenna output waveform from the SLC, wherein the criterion to minimize the jamming influence includes minimizing an output residual power of the side-lobe-suppressed main antenna output waveform;

transform the auxiliary antenna output waveform using respective transforming units $Tr_1$ to $Tr_N$ to provide transformed auxiliary antenna output waveforms, the transforming units configured to use one or more control parameters calculated from the respective weighting function $W(\omega)$ at discrete angular frequencies $\omega_q$, wherein each output waveform $s_1$ to $s_N$ from the antenna elements or sub arrays of the auxiliary antenna is provided to the transforming units $Tr_1$ to $Tr_N$;

calculate control parameters on a recurring basis;

provide the calculated control parameters to the respective transforming units via respective control signals $C_1$ to $C_N$, for use in transforming the auxiliary antenna output waveforms; and subtract the transformed auxiliary antenna output waveforms in the time or frequency domain from the delayed output waveform of the main antenna to provide the side-lobe-suppressed main antenna output waveform from the SLC having reduced jamming influence over the bandwidth B;

successively time delay auxiliary antenna output waveforms $s_{in}(m \cdot T)$ via respective transforming units in Q−1 time steps T, from 1 to Q−1 to provide time delayed copies of the auxiliary antenna output waveform $s_{in}(m \cdot T)$;

calculate, via respective transforming units, Q parameters comprising weighting coefficients $w_{n,0}$ to $w_{n,Q-1}$ for antenna element n, identified with two indexes the first corresponding to the antenna element number and the second corresponding to a consecutive number q representing a spectral component and ranging from 0 to Q−1, the SLC configured to calculate Q parameters comprising the weighting coefficients $w_{n,0}$ to $w_{n,Q-1}$ via inverse Fourier transformation (IFT) of $W(\omega) = A(\omega) \cdot e^{-j \cdot \omega \cdot \tau(\omega)}$ for the Q spectral components q, resulting from dividing the bandwidth B in Q components, the calculation being performed for each antenna element or sub array $(A_1-A_N)$ by minimizing the jamming influence on the side-lobe-suppressed main antenna output waveform at a center frequency $f_q$ of each spectral component q; and multiply, via respective transforming units, the auxiliary antenna output waveform $s_{in}(m \cdot T)$ with the first weighting coefficient $w_{n,0}$;

successively multiply, via respective transforming units, respective time delayed copies of the auxiliary antenna output waveform with the weighting coefficient having the same second index as the number of time step delays T included in the time delayed copy of the auxiliary antenna output waveform; and sum, via respective transforming units, the result of each multiplication to provide an output waveform $s_{out}(m \cdot T)$ from each transforming unit, wherein the SLC is configured to reduce a number of operations to less than Q operations via (1) setting the first x weighting coefficients and the last y weighting coefficients in the series of weighting coefficients $w_{n,0}$ to $w_{n,Q-1}$ to zero, (2) integrating the first x time delays T into a time delay D, equal to x·T, and (3) excluding the last y multiplications.

* * * * *